US009762274B2

(12) United States Patent
Rai et al.

(10) Patent No.: US 9,762,274 B2
(45) Date of Patent: Sep. 12, 2017

(54) FEEDBACK RECEIVE PATH WITH RF FILTER

(71) Applicant: QUALCOMM Incorporated, San Diego, CA (US)

(72) Inventors: Shailesh Shekhar Rai, San Diego, CA (US); Mahim Ranjan, San Diego, CA (US); Jeremy Mark Goldblatt, San Diego, CA (US); Frederic Bossu, San Diego, CA (US); Vijay Chellappa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/664,622

(22) Filed: Mar. 20, 2015

(65) Prior Publication Data

US 2015/0349821 A1  Dec. 3, 2015

Related U.S. Application Data

(60) Provisional application No. 62/004,758, filed on May 29, 2014.

(51) Int. Cl.
*H01Q 11/12*  (2006.01)
*H04B 1/12*  (2006.01)
*H04B 15/00*  (2006.01)
*H04B 1/04*  (2006.01)

(52) U.S. Cl.
CPC .............. *H04B 1/12* (2013.01); *H04B 1/0475* (2013.01); *H04B 15/00* (2013.01); *H04B 2001/0416* (2013.01)

(58) Field of Classification Search
CPC .......... H04B 1/04; H04B 1/0475; H04B 1/12; H04B 15/00; H04B 2001/0416
USPC ...................................... 455/114.2, 126, 127
See application file for complete search history.

(56) References Cited

U.S. PATENT DOCUMENTS

| 3,643,173 | A | * | 2/1972 | Whitten | H03H 11/126 330/107 |
| 4,099,125 | A | * | 7/1978 | Bennett, Jr. | H04Q 1/446 329/325 |
| 4,696,055 | A | * | 9/1987 | Marshall | H03C 1/60 327/255 |
| 5,345,375 | A | * | 9/1994 | Mohan | H02J 3/01 307/105 |
| 5,663,675 | A | | 9/1997 | O'Shaughnessy | |
| 5,694,082 | A | | 12/1997 | Schmidt | |

(Continued)

FOREIGN PATENT DOCUMENTS

| EP | 0595781 A2 | 5/1994 |
| EP | 2091144 A1 | 8/2009 |

OTHER PUBLICATIONS

International Search Report and Written Opinion—PCT/US2015/030403—ISA/EPO—Jul. 17, 2015, 12 pages.

*Primary Examiner* — Edward Urban
*Assistant Examiner* — Max Mathew
(74) *Attorney, Agent, or Firm* — Qualcomm Incorporated-Toler

(57) ABSTRACT

An apparatus includes an elliptical inductance-capacitance (LC) filter and a resistive-capacitive (RC) notch filter serially coupled to the elliptical LC filter. The elliptical LC filter and the RC notch filter are configured to filter a radio-frequency (RF) signal received by a feedback receive path.

21 Claims, 8 Drawing Sheets

(56) References Cited

U.S. PATENT DOCUMENTS

| | | | |
|---|---|---|---|
| 5,896,306 A * | 4/1999 | Aschwanden | H04L 25/03133 375/350 |
| 6,975,843 B2 * | 12/2005 | Simonsen | H03F 3/217 375/295 |
| 7,761,067 B1 * | 7/2010 | Tsai | H03H 7/12 455/114.2 |
| 8,237,509 B2 | 8/2012 | Kim et al. | |
| 8,433,013 B2 | 4/2013 | Nakano et al. | |
| 8,526,890 B1 | 9/2013 | Chien et al. | |
| 8,688,045 B2 | 4/2014 | Lin et al. | |
| 9,130,622 B2 * | 9/2015 | Montalvo | H04B 1/0475 |
| 2003/0053552 A1 | 3/2003 | Hongo et al. | |
| 2007/0140391 A1 | 6/2007 | Pan | |
| 2008/0007344 A1 * | 1/2008 | Natzke | H03F 3/08 330/308 |
| 2009/0023411 A1 | 1/2009 | Katsube et al. | |
| 2009/0054018 A1 * | 2/2009 | Waheed | H03G 3/3047 455/126 |
| 2009/0073949 A1 | 3/2009 | Malak et al. | |
| 2009/0280766 A1 | 11/2009 | Rofougaran et al. | |
| 2010/0271151 A1 * | 10/2010 | Ko | H03H 7/06 333/176 |
| 2011/0148534 A1 * | 6/2011 | Lee | H03B 5/1228 331/117 FE |
| 2013/0149983 A1 * | 6/2013 | Fahim | H03G 3/3052 455/326 |
| 2013/0195164 A1 * | 8/2013 | Chen | H04S 1/007 375/227 |
| 2014/0029683 A1 | 1/2014 | Morris et al. | |
| 2014/0184356 A1 * | 7/2014 | Kihara | H01L 27/016 333/174 |
| 2015/0236748 A1 * | 8/2015 | Nobbe | H04B 17/12 455/78 |

\* cited by examiner

FEEDBACK RECEIVE PATH WITH RF FILTER

I. CROSS-REFERENCE TO RELATED APPLICATIONS

The present application claims priority from U.S. Provisional Patent Application No. 62/004,758, filed May 29, 2014 and entitled "RADIO-FREQUENCY MULTIPLE-STAGE FILTER IN A FEEDBACK PATH," the content of which is incorporated by reference in its entirety.

II. FIELD

The present disclosure relates generally to electronics, and more specifically to transmitters and receivers.

III. DESCRIPTION OF RELATED ART

It is generally desirable to reduce the die area used for transmitters and receivers. Because die area is sometimes limited by the number of interface pins available, reducing a number of pins may enable die area to be reduced.

Transmit power control may be accomplished using open loop power control. Open loop power control can increase factory calibration time, may be subject to accuracy degradation due to power supply variation and temperature variation, and may use a complex look-up table. Alternatively, a feedback receiver can be used to detect and downconvert a transmitted signal. Downconverted signal information can be used in a feedback loop to control transmission power.

Portable communication devices may concurrently transmit and receive signals in multiple frequency bands. For example, the Global System for Mobile Communications (GSM) may use an uplink frequency band from 777 MHz to 792 MHz, the General Packet Radio Services (GPRS) may use an uplink frequency band from 880 MHz to 915 MHz, and wireless local area network (WLAN) systems may use channels that range from 2.4 gigahertz (GHz) and 2.484 GHz. Table 1 illustrates example transmit channel frequencies that may be used by some conventional radio-frequency communication protocols used in handheld mobile communication devices.

TABLE 1

| Band | Victim Band | | Aggressor Band | |
| | Tx Low (MHz) | Tx High (MHz) | TX 2 Bands (MHz) | | WLAN 2.4 GHz (MHz) | |
| --- | --- | --- | --- | --- | --- | --- |
| 13 | 777 | 787 | 2300 | 2400 | | |
| 14 | 788 | 798 | 2300 | 2400 | | |
| 110 | 806 | 824 | | | 2400 | 2484 |
| 26 | 814 | 849 | | | 2400 | 2484 |
| 18 | 815 | 830 | | | 2400 | 2484 |
| 1000 | 815 | 830 | | | 2400 | 2484 |
| 5 | 824 | 849 | | | 2400 | 2484 |
| 100 | 824 | 849 | | | 2400 | 2484 |
| 6 | 830 | 845 | 2496 | 2690 | | |
| 19 | 830 | 845 | 2496 | 2690 | | |
| 20 | 832 | 862 | 2496 | 2690 | | |
| 8 | 880 | 915 | 2496 | 2690 | | |

Table 1 includes "victim" bands defined by ranges of frequencies in megahertz (MHz) that are relatively lower when compared against ranges of signal frequencies in "aggressor" bands. Table 1 shows, for each of the victim bands, a band or channel identifier, a low frequency corresponding to the channel identifier and a high frequency corresponding to the channel identifier. A victim band may be transmitted as a first signal via a first transmit path (TX 1), and an aggressor band may be transmitted as a second signal via a second transmit path (TX 2) that may include a wireless local area network (WLAN) transmitter. The aggressor bands include the TX 2 bands denoted by a low-frequency and a high frequency and also include WLAN bands denoted by a low frequency and a corresponding high frequency. The victim bands are represented by transmit frequencies from 777 MHz to 915 MHz, while the aggressor bands are represented by transmit frequencies from 2300 MHz to 2690 MHz. The transmit frequency of each aggressor band is approximately a factor of three higher than the transmit frequency of the corresponding victim band.

Transmit power control methods that detect low-band transmit signals (e.g., at TX 1) using the feedback path receiver may present challenges in a system that simultaneously transmits WLAN transmit signals (e.g., at TX 2) at relatively high power. For example, when the transmit signal power at frequency TX 1 is 0 decibel-milliwatts (dBm) at a first antenna, the power reaching the feedback path receiver at frequency TX 1 may be −25 dBm. To provide a measure of third-order intermodulation distortion of −55 dBm at the feedback path receiver input, a filter that provides rejection at the frequency TX 2 may be used. Stated another way, the signal power of the fundamental frequency at TX 1 is desired to be 355 dBm greater than signal power from third-order intermodulation introduced by the operation of the second transmit signal at TX 2. When the transmit signal power at frequency TX 2 is 24 dBm at a second antenna, and assuming 15 decibels (dB) of antenna isolation, the feedback signal power in the feedback receive path may be as high as about −26 dBm when the system has a coupling loss of 25 dB and a third order feedback rejection of an additional 10 dB. Accordingly, a filter that provides approximately 30 dB of attenuation may achieve a third-order intermodulation distortion of −55 dBm.

Intermodulation distortion is created when an output stage of a transceiver is concurrently operated at two or more transmit frequencies and the output stage components (e.g., a power amplifier, a coupler and an antenna) have non-linear gain responses. In effect, when the power amplifier, antenna and coupler have non-linear response profiles, these elements mix the transmit signals, creating additional second order signals at 2*(TX 1), 2*(TX 2) and (TX 1)+(TX 2). These second order signals are removed from the fundamental frequencies and can be reduced or avoided by use of differential signal operation. However, third-order intermodulation signals, which include combinations of the fundamental transmit frequencies TX 1 and TX 2 with the second order signals, are also generated and may appear within the frequency bands of interest. That is, these third-order intermodulation signals occur at or near the fundamental frequency TX 1 and fundamental frequency TX 2, and the application of filters at these frequencies would be detrimental to the effectiveness of the feedback path receiver.

IV. BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals FIG. 1 is a diagram showing a wireless device communicating with a wireless communication system.

V. DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein may include files that are not executable in nature, such as documents that may need to be opened or other data files that need to be accessed.

As used herein, the term "on-line" refers to performing transmit power control such as described herein while a communication device is in use, such as when engaged in a data or voice communication session.

Figure 1:
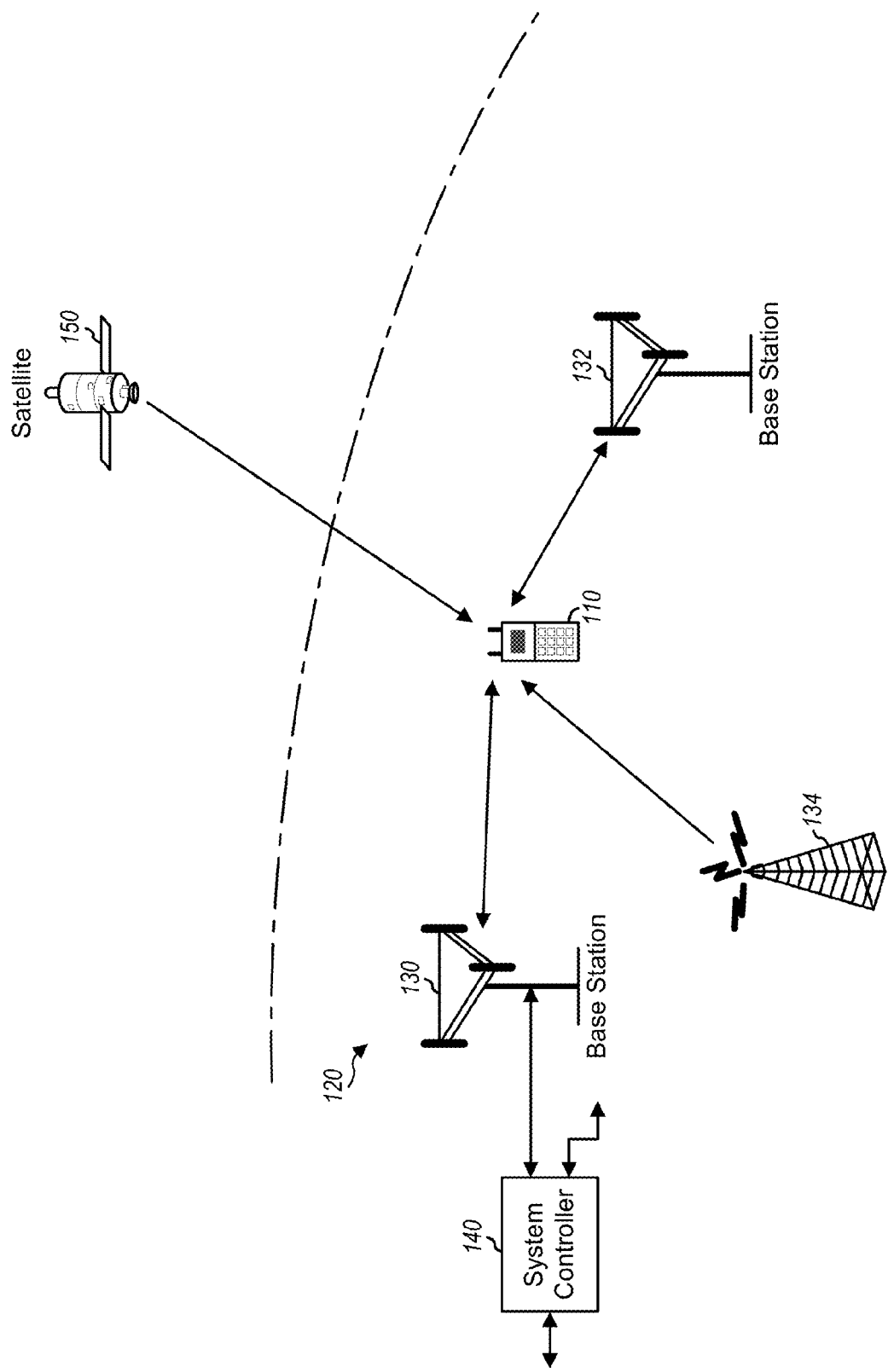

FIG. 1 is a diagram showing a wireless device 110 communicating with a wireless communication system 120. The wireless communication system 120 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. For simplicity, FIG. 1 shows wireless communication system 120 including two base stations 130 and 132 and one system controller 140. In general, a wireless communication system may include any number of base stations and any set of network entities.

The wireless device 110 may also be referred to as user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. Wireless device 110 may communicate with wireless communication system 120. Wireless device 110 may also receive signals from broadcast stations (e.g., a broadcast station 134), signals from satellites (e.g., a satellite 150) in one or more global navigation satellite systems (GNSS), etc. Wireless device 110 may support one or more radio technologies for wireless communication such as LTE, WCDMA, CDMA 1x, EVDO, TD-SCDMA, GSM, 802.11, etc.

Wireless device 110 may support carrier aggregation, which includes operation on multiple carriers. Carrier aggregation may also be referred to as multi-carrier operation. Wireless device 110 may be able to operate in a low-band (LB) frequency band group (e.g., a "band group" of one or more frequency bands in which a highest frequency included in the one or more frequency bands does not exceed 1000 megahertz (MHz)), a mid-band (MB) frequency band group (e.g., a band group of one or more frequency bands in which a lowest frequency included in the one or more frequency bands exceeds 1000 MHz and in which a highest frequency included in the one or more frequency bands does not exceed 2300 MHz), and/or high-band (HB) frequency band group (e.g., a band group of one or more frequency bands in which a lowest frequency included in the one or more frequency bands exceeds 2300 MHz). For example, low-band may cover 698 to 960 MHz, mid-band may cover 1475 to 2170 MHz, and high-band may cover 2300 to 2690 MHz and 3400 to 3800 MHz. Low-band, mid-band, and high-band refer to three groups of bands (or band groups), with each band group including a number of frequency bands (or simply, "bands"). In some implementations, each band may have a bandwidth that is less than or equal to 200 MHz and may include one or more carriers. Each carrier may cover up to 20 MHz in LTE. LTE Release 11 supports 35 bands, which are referred to as LTE/UMTS bands and are listed in 3GPP TS 36.101.

Wireless device 110 may include a transceiver that has a transmit path to generate a wireless signal for transmission. A receive feedback path of the wireless device 100 may provide a portion of the transmitted signal to an energy measurement circuit to enable the wireless device 110 to perform power control of the transmitted signal. The wireless device 110 includes an RF filter in the receive feedback path that is configured to attenuate components of an aggressor frequency band (e.g. a TX 2 transmission) on a victim frequency band (e.g., a TX 1 transmission) at the feedback receive path. Examples of the RF filter that may be implemented in the receive feedback path of the wireless device 110 are described in further detail with respect to FIGS. 2-6.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2:
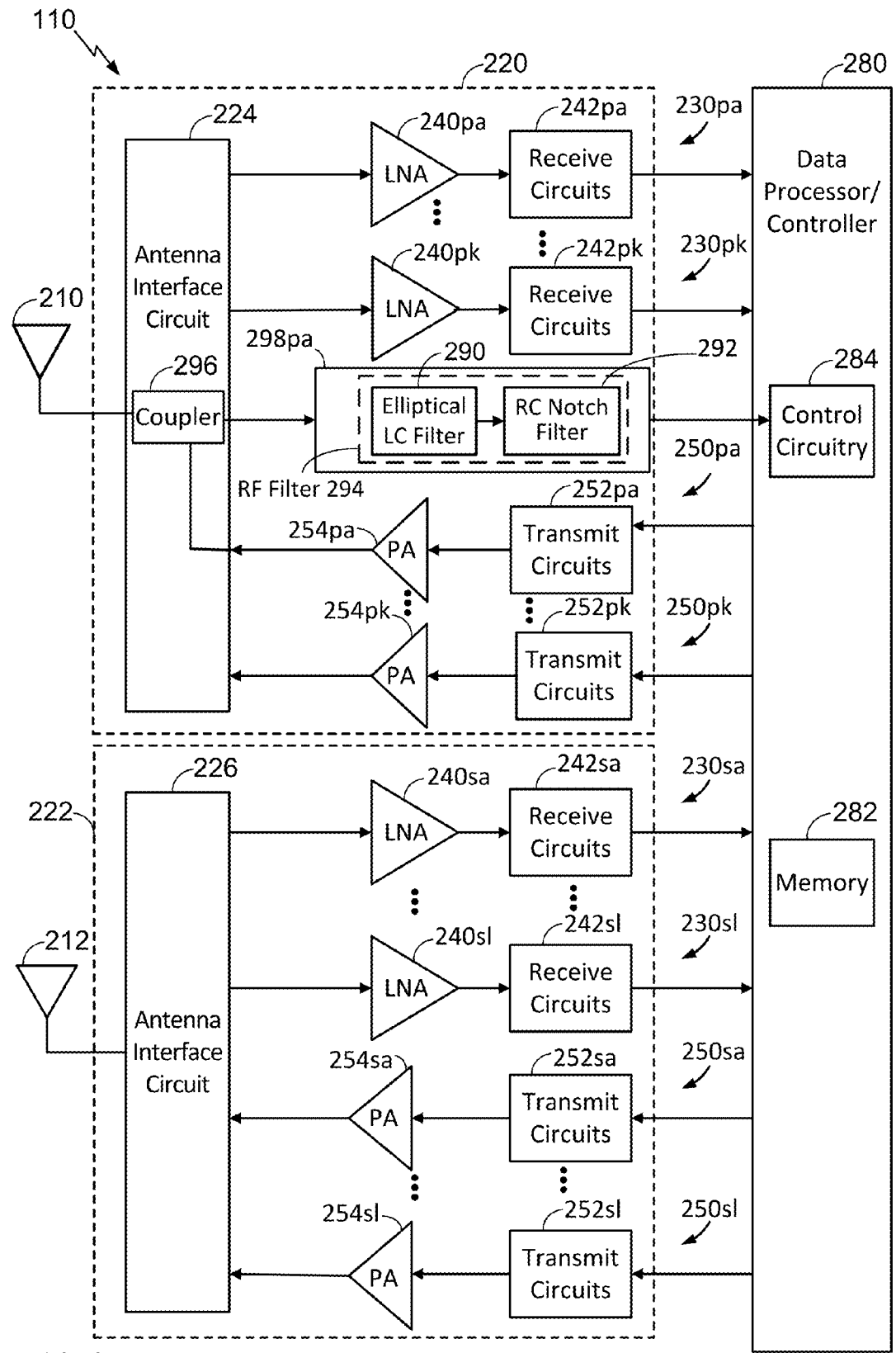
FIG. 2 is a diagram of components including an RF filter that may be used in the wireless device of FIG. 1.

FIG. 2 shows a block diagram of an exemplary design of the wireless device 110 in FIG. 1. In this exemplary design, the wireless device 110 includes a transceiver 220 coupled to a primary antenna 210, a transceiver 222 coupled to a secondary antenna 212, and a data processor/controller 280. The transceiver 220 includes multiple (K) receivers 230pa to 230pk and multiple (K) transmitters 250pa to 250pk to support multiple frequency bands, multiple radio technologies, carrier aggregation, etc. The transceiver 222 includes multiple (L) receivers 230sa to 230sl and multiple (L) transmitters 250sa to 250sl to support multiple frequency bands, multiple radio technologies, carrier aggregation, receive diversity, multiple-input multiple-output (MIMO) transmission from multiple transmit antennas to multiple receive antennas, etc.

In the exemplary design shown in FIG. 2, each receiver 230pa to 230pk and 230sa to 230sl includes an LNA 240pa to 240pk and 240sa to 240sl and a receive circuit 242pa to 242pk and 242sa to 242sl, respectively. For data reception, the primary antenna 210 receives signals from base stations and/or other transmitter stations and provides a received RF signal, which is routed through an antenna interface circuit 224 and presented as an input RF signal to a selected receiver (e.g., the receiver 230*pk*). In a similar manner, the secondary antenna 212 receives signals from base stations and/or other transmitter stations and provides a received RF signal, which is routed through an antenna interface circuit 226 and presented as an input RF signal to a selected receiver.

The antenna interface circuit 224 may include switches, duplexers, transmit filters, receive filters, matching circuits, etc. The description below assumes that the receiver 230*pk* is the selected receiver. Within the receiver 230*pk*, an LNA 240*pk* amplifies the input RF signal and provides an output RF signal.

The receive circuits 242*pk* may downconvert the output RF signal from RF to baseband, amplify and filter the downconverted signal, and provide an analog input signal to the data processor/controller 280. The receive circuits 242*pk* may include mixers, filters, amplifiers, matching circuits, an oscillator, a local oscillator (LO) generator, a phase locked loop (PLL), etc. Each remaining receiver 230*pa*, 230*sa*, 230*sl* in the transceivers 220, 222 may operate in similar manner as the receiver 230*pk*.

In the exemplary design shown in FIG. 2, each transmitter 250*pa* to 250*pk* and 250*sa* to 250*sl* includes a transmit circuit 252*pa* to 252*pk* and 252*sa* to 252*sl* and a power amplifier (PA) 254*pa* to 254*pk* and 254*sa* to 254*sl*, respectively. For data transmission, the data processor/controller 280 processes (e.g., encodes and modulates) data to be transmitted and provides an analog output signal to a selected transmitter. The description below assumes that the transmitter 250*pa* is the selected transmitter. Within transmitter 250*pa*, the transmit circuits 252*pa* amplify, filter, and upconvert the analog output signal from baseband to RF and provide a modulated RF signal. The transmit circuits 252*pa* may include amplifiers, filters, mixers, matching circuits, an oscillator, an LO generator, a PLL, etc. A PA 254*pa* receives and amplifies the modulated RF signal and provides a transmit RF signal. The transmit RF signal is routed through a coupler 296 in the antenna interface circuit 224 and transmitted via the primary antenna 210. Each remaining transmitter 250*pk*, 250*sa*, 25*sl* in the transceivers 220, 222 may operate in similar manner as the transmitter 250*pa*.

FIG. 2 shows an exemplary design of receivers 230*pa* to 230*pk* and 230*sa* to 230*sl* and transmitters 250*pa* to 250*pk* and 250*sa* to 250*sl*. A receiver and a transmitter may also include other circuits not shown in FIG. 2, such as filters, matching circuits, etc. All or a portion of the transceivers 220 and 222 may be implemented on one or more analog integrated circuits (ICs), RF ICs (RFICs), mixed-signal ICs, etc. For example, LNAs 240*pa* to 240*pk* and 240*sa* to 240*sl* and receive circuits 242*pa* to 242*pk* and 242*sa* to 242*sl* may be implemented on one module, which may be an RFIC, etc. The circuits in the transceivers 220 and 222 may also be implemented in other manners.

The coupler 296 provides a portion of the signal that is received from the power amplifier 254*pa* as a feedback receive signal to feedback receive circuitry 298*pa* via a feedback receive path. The feedback receive circuitry 298*pa* includes an RF filter 294. The RF filter 294 is a multi-stage filter that includes a first filter, such as an elliptical inductive-capacitance (LC) filter 290, coupled in series with a second filter, such as a resistive-capacitive (RC) notch filter 292. The feedback receive circuitry 298*pa* may further include bypass circuitry (not shown) that enables the elliptical LC filter 290 and/or the RC notch filter 292 to be bypassed, such as described in further detail with respect to FIG. 5. An output of the feedback receive circuitry 298*pa* (e.g., an output of the RC notch filter 292) may be provided to control circuitry 284 at the data processor/controller 280. The elliptical LC filter 290 may be configured to provide relatively low in-band ripple or droop at a carrier frequency of a victim band (e.g., of the transmitter 250*pa*) with a relatively sharp filter roll-off. The RC notch filter 292 may be configured to attenuate a frequency component within a frequency notch that includes a carrier frequency of an aggressor band (e.g., a WLAN signal transmitted at the transmitter 250*sa*). The control circuitry 284 may be configured to perform one or more signal energy measurements of the signal received from the RF filter 294 and to adjust a transmission power of the transmitter 250*pa* as part of a closed-loop power control operation. Example implementations of the RF filter 294 are described with respect to FIGS. 4-6, and an example of a frequency response of the RF filter 294 is illustrated in FIG. 7. As described in further detail with respect to FIG. 7, the RF filter 294 may provide relatively low attenuation (or in-band "droop") at a victim band frequency and may provide strong attenuation of the aggressor bands that are at approximately three times the victim band frequency. As a result, a third-order intermodulation distortion of −55 dBm may be achieved.

The data processor/controller 280 may perform various functions for wireless device 110. For example, the data processor/controller 280 may perform processing for data received via the receivers 230*pa* to 230*pk* and 230*sa* to 230*sl* and data to be transmitted via the transmitters 250*pa* to 250*pk* and 250*sa* to 250*sl*. The data processor/controller 280 may control the operation of the various circuits within transceivers 220 and 222. A memory 282 may store program code and data for data processor/controller 280. Data processor/controller 280 may be implemented on one or more application specific integrated circuits (ASICs) and/or other ICs. Although the control circuitry 284 is illustrated as included within the data processor/controller 280, in other implementations the control circuitry 284 may be external to the data processor/controller 280.

Figure 3:
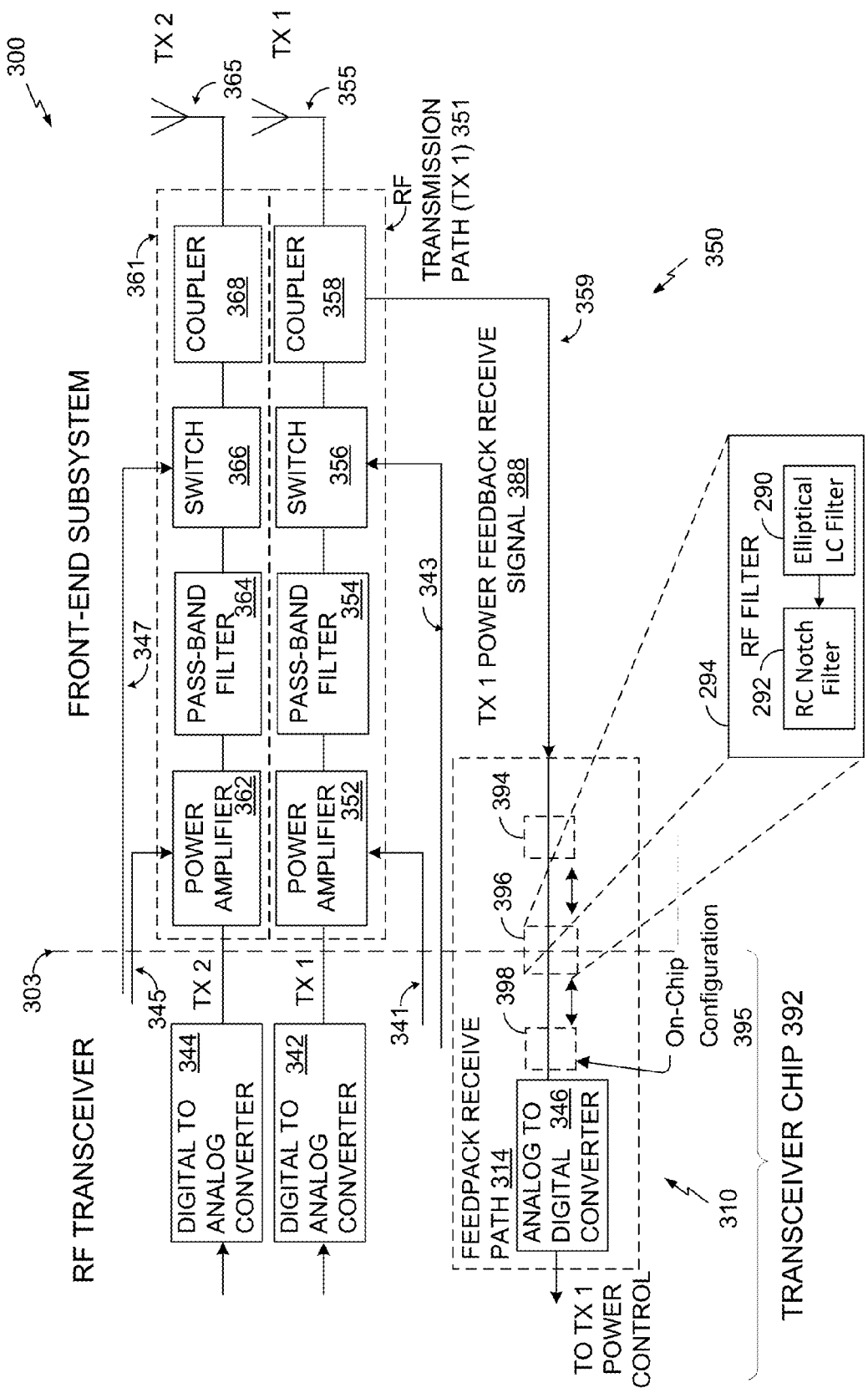
FIG. 3 is another diagram of components including an RF filter that may be used in the wireless device of FIG. 1.

FIG. 3 illustrates an exemplary embodiment of a wireless communication device 300 that includes an RF transceiver 310 and a front-end subsystem 350. The wireless communication device 300 may correspond to the wireless communication device 110 of FIG. 1. The front-end subsystem 350 amplifies, filters and controllably provides a first transmit signal operating at a transmit frequency TX 1 to an antenna 355. In addition, the RF transceiver 310 and the front-end subsystem 350 amplifies, filters and controllably provides a second transmit signal operating at a transmit frequency of TX 2 to an antenna 365.

The front-end subsystem 350 includes a transmit path 351 that controllably couples an analog signal at TX 1 from a digital-to-analog convertor (DAC) 342 of the RF transceiver 310 to the antenna 355. The transmit path 351 includes a serial arrangement of a power amplifier 352, a pass-band filter 354, a switch 356 and a coupler 358. The power amplifier 352 receives a transmit signal from DAC 342 and forwards an amplified version of the transmit signal in accordance with a gain control signal on connection 341. The pass-band filter 354 attenuates extraneous signals or noise in frequencies below and above TX 1. The pass-band filtered version of the amplified transmit signal is selectively forwarded by switch 356 to the coupler 358 in accordance with a control signal on connection 343. The coupler 358 is configured to be coupled to a first antenna, such as the antenna 355. The coupler 358 passes the majority of the energy of the pass-band filtered version of the amplified transmit signal to the antenna 355 and a portion of the pass-band filtered version of the amplified transmit signal is forwarded on connection 359 to a feedback path 314 of the RF transceiver 310. The feedback path 314 includes an analog-to-digital convertor (ADC) 346 and also includes the RF filter 294 at a first location 394, at a second location 396, or at a third location 398, as explained in further detail below.

Similarly, transmit path 361 controllably couples an analog signal at TX 2 from DAC 344 of the RF transceiver 310 to antenna 365. The transmit path 361 includes a serial arrangement of a power amplifier 362, a pass-band filter 364, a switch 366 and a coupler 368. The power amplifier 362 receives a transmit signal from DAC 344 and forwards an amplified version of the transmit signal in accordance with a gain control signal on connection 345. The pass-band filter 364 attenuates extraneous signals or noise in frequencies below and above TX 2. The pass-band filtered version of the amplified transmit signal is selectively forwarded by switch 366 to the coupler 368 in accordance with a control signal on connection 347. The coupler 368 is configured to be coupled to a second antenna, such as the antenna 365. The coupler 368 passes a majority of the signal energy to the antenna 365.

To detect low-band transmit signals (e.g., at TX 1) using a power feedback signal, while simultaneously transmitting WLAN transmit signals (e.g., at TX 2) at relatively high power, the RF filter 294 may be used to filter the WLAN transit signal frequencies in the feedback path 314. As shown in the exemplary embodiment of FIG. 3, the feedback path 314 may include one or more components at the RF transceiver 310 and may also include one or more components at the front-end subsystem 350. Thus, the RF filter 294 may be implemented in a first location 394 in the front-end subsystem 350, in a second location 396 at or near an interface 303 between the RF transceiver 310 and the front-end subsystem 350, or in a third location 398 in the RF transceiver 310. The third location 398 may correspond to an on-chip configuration 395 (where the RF filter 294 is located on a transceiver chip 392). Implementing the RF filter 294 using the on-chip configuration 395 may result in a lower cost (e.g., a lower bill of material (BOM)) as compared to implementing the RF filter 294 as an external filter (e.g., external to the transceiver chip 392). Regardless of the location along the feedback path 314, the RF filter 294 receives a portion of the first transmit signal power and may be configured to generate a modified feedback signal. The modified feedback signal may have a relatively small in-band droop (e.g., a signal power change) over a first range of frequencies (TX 1) and may have a relatively large signal power rejection at the second transmit frequency (TX 2).

One or more of the gain control signals on connection 341 and connection 345 may originate from a baseband processor or a controller, such as the data processor/controller 280 of FIG. 2, that programmatically adjusts the transmit signal power that radiates from the wireless communication system 300.

One or more of the switch control signals on connection 343 and connection 347 may originate from a baseband processor or controller, such as the data processor/controller 280 of FIG. 2. The baseband processor or controller may be located outside the RF transceiver 310 and the front-end subsystem 350. The switch control signals on connection 343 and connection 347 may be used by the baseband processor or controller to programmatically adjust the timing of when the first and second transmit signals radiate from the wireless communication system 300. Accordingly, the baseband processor or controller may function in accordance with one or more applications, programs, components, databases, tables, or modules to coordinate the transmission of appropriately timed transmit signals in support of multiple wireless communication protocols. The baseband processor or controller may be programmed to avoid (or to reduce effects of) interfering signals from one or more additional internal or external transmitters (not shown).

In an exemplary embodiment, the baseband processor or controller may be arranged to receive feedback signal in-phase and quadrature phase components to perform power estimation. For example, the receive feedback path 314 may include components, such as one or more mixers, filters, amplifiers, matching circuits, an oscillator, a local oscillator (LO) generator, and/or a phase locked loop (PLL), as described with respect to the receive circuits 242 of FIG. 2. In an exemplary embodiment, the baseband processor or controller may be arranged to take advantage of one or more signal processing techniques to avoid errors due to direct-current (DC) offset. In an exemplary embodiment, the baseband processor or controller provides a transmit signal and control signals to the RF transceiver 310, and the RF transceiver 310 provides on-line power estimation to perform power control. The digital baseband module may use estimated power information to update a gain that is applied to the transmit signal by the front-end subsystem 350.

Figure 4:
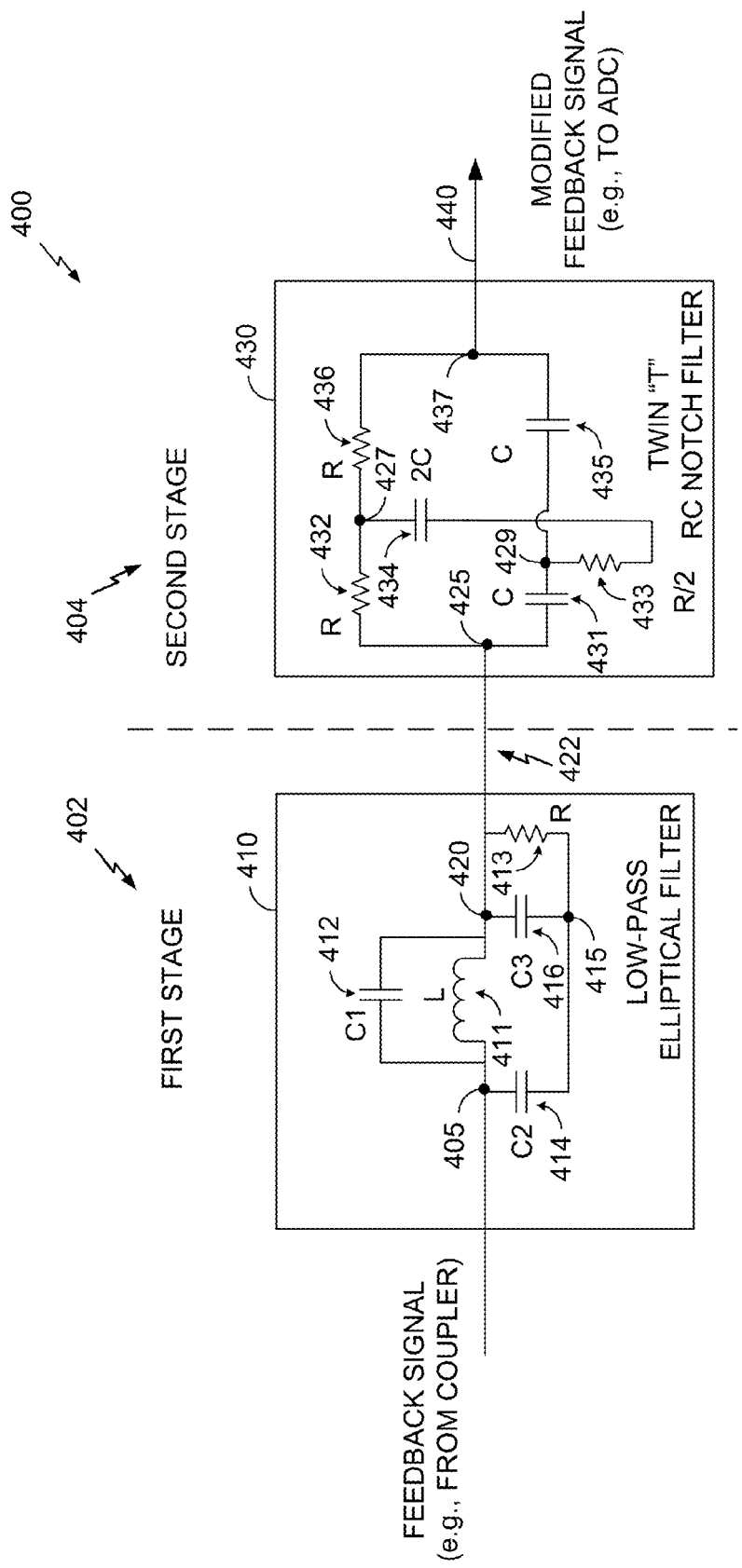
FIG. 4 depicts an exemplary embodiment of an RF filter that may be used in the wireless device of FIG. 1.

FIG. 4 is an exemplary diagram showing an embodiment of a multi-stage RF filter 400 (e.g., an embodiment of the RF filter 294 of FIG. 2 and FIG. 3). A first stage 402 is closest to a coupler (e.g., the coupler 296 of FIG. 2 or the coupler 358 of FIG. 3) and includes an elliptical LC filter, such as a low-pass elliptical filter 410. A second stage 404 closest to an ADC (e.g., the ADC 346 of FIG. 3) includes an RC notch filter 430. The output of the first stage 402 is coupled to an input of the second stage 404 via a connection 422.

The low-pass elliptical filter (LPEF) 410 includes a RLC circuit that may be implemented using circuit elements in an integrated circuit. The LPEF 410 includes a first capacitor 412 coupled to a first node 405 (an input node) and to a second node 420 (an output node). An inductor 411 is coupled to the first node 405 and to the second node 420. A second capacitor 414 is coupled to the first node 405 and to a third node 415. A third capacitor 416 is coupled to the second node 420 and to the third node 415. A resistor 413 is coupled to the second node 420 and to the third node 415.

The LPEF 410 is characterized by the output signal at the connection 422. The output signal includes ripple in a pass-band range of frequencies ("in-band ripple") and in a stop-band range of frequencies as well as a transition ("filter roll-off") between the pass-band frequencies and the stop-band frequencies. One or more of the capacitance values (C1 of the first capacitor 412, C2 of the second capacitor 414, and C3 of the third capacitor 416), the resistance R of the resistor 413, and the inductance L of the inductor 411 can be selected to produce low in-band ripple and relatively sharp filter roll-off. One or more additional inductors in parallel with at least one respective capacitor can be added to the LPEF 410 to modify the rate of transition between the pass band and the stop band. Those skilled in the art of integrated circuit design and manufacturing are capable of replicating the circuit elements and to select resistance, inductance and capacitance values to achieve desired characteristics from the first stage 410 of the multi-stage filter 400.

In the illustrated exemplary embodiment, the RC notch filter 430 is a twin "T" notch filter. The twin "T" notch filter (TTNF) 430 includes an RC circuit that may be implemented using circuit elements in an integrated circuit. The TTNF 430 includes a first resistor 432 coupled to a first node 425 (an input node) and to a second node 427. A first capacitor 431 is coupled to the first node 425 and to a third node 429. A second resistor 436 is coupled to the second node 427 and to a fourth node 437 (an output node). A second capacitor 435 is coupled to the third node 429 and to the fourth node 437. A third resistor 433 and a third capacitor 434 are coupled in series between the second node 427 and the third node 429. The third resistor 433, the first capacitor 431, and the second capacitor 435 form the first "T". The third capacitor 434, the first resistor 432, and the second resistor 436 form the second "T". As indicated, the first capacitor 431 and the second capacitor 435 are in parallel with the first resistor 432 and the second resistor 436 between the input node 425 and the output node 437.

The TTNF 430 may be characterized by an output signal on a connection 440. The output signal includes a narrow stop-band or notch at a notch frequency. The capacitance and resistance values may be selected to set the notch frequency and/or one or more other filter characteristics. As an example, the resistor 433 may have a resistance that is half the resistance of the resistor 432 and half the resistance of the resistor 436. In addition, the capacitor 434 may have a capacitance that is twice the capacitance of the capacitor 431 and that is twice the capacitance of the capacitor 435. The more accurately the resistances and the capacitances match the ratios given above, the deeper the notch at the output node 440. Those skilled in the art of integrated circuit design and manufacturing are capable of replicating the circuit arrangement and to select resistance and capacitance values to achieve desired characteristics from the second stage 430 of the multi-stage filter 400.

Figure 5:
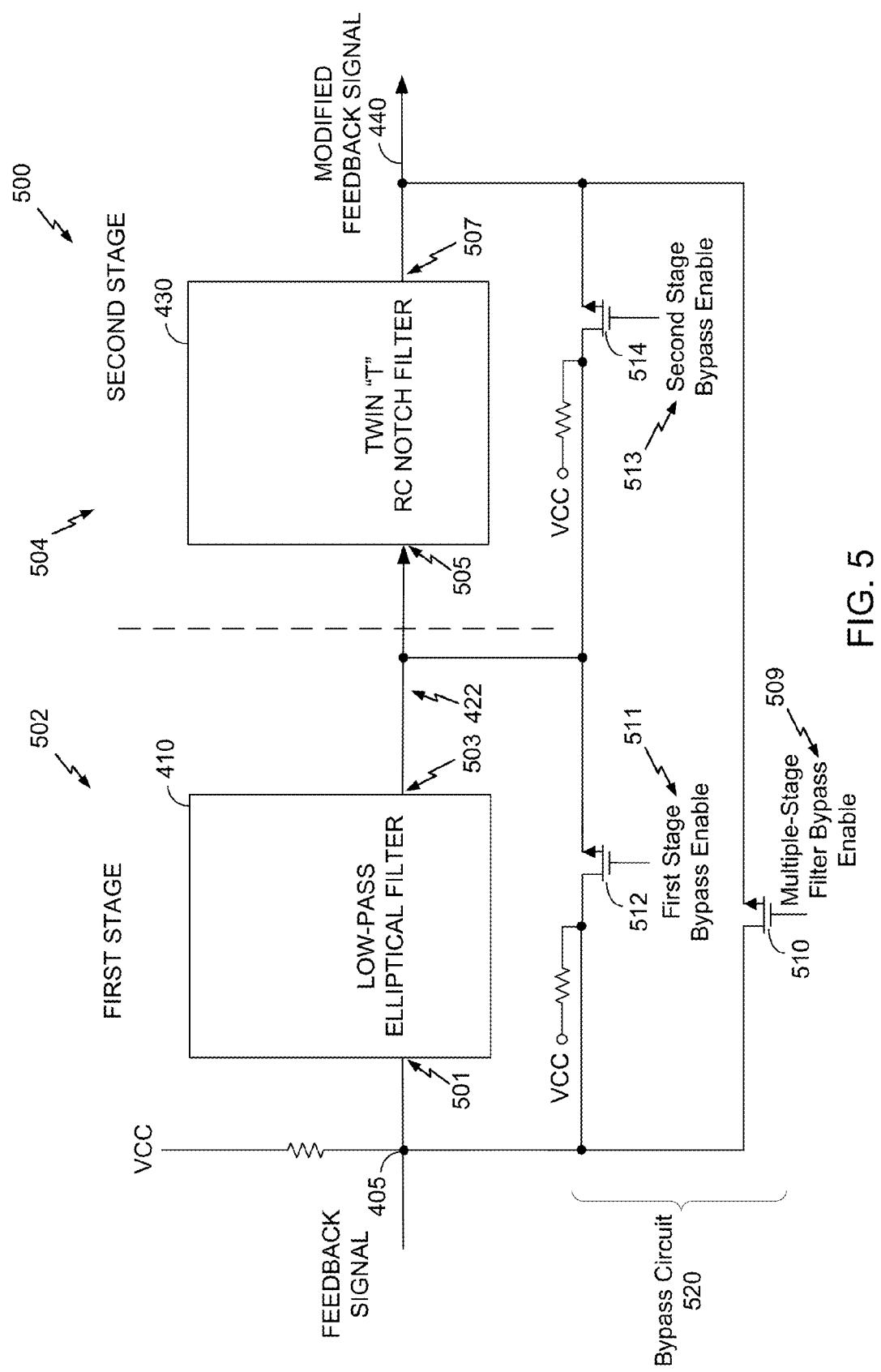
FIG. 5 depicts another exemplary embodiment of an RF filter that may be used in the wireless device of FIG. 1.

FIG. 5 is a diagram showing circuit elements and connections that enable one or both of a first stage 502 and a second stage 504 of a multiple-stage RF filter 500 to be bypassed. The first stage 502 may correspond to the first stage 402 of FIG. 4, and the second stage 504 may correspond to the second stage 404 of FIG. 4. A bypass circuit 520 is configured to enable a feedback receive signal to bypass at least a portion of the RF filter 500. The bypass circuit 520 includes a single-stage bypass circuit that includes a first stage bypass transistor 512 coupled to the LPEF 410 (e.g., coupled to an input 501 of the LPEF 410 and to an output 503 of the LPEF 410). The bypass circuit 520 includes a second stage bypass transistor 514 coupled to the RC notch filter 430 (e.g., coupled to an input 505 of the RC notch filter 430 and to an output 507 of the RC notch filter 430). The bypass circuit 520 includes a multi-stage bypass circuit that includes a multi-stage bypass transistor 510 coupled to the input 501 of the LPEF 410 and to the output 507 of the RC notch filter 430. The multi-stage bypass transistor 510 may enable the feedback receive signal to bypass the multiple-stage RF filter 500 (i.e., to bypass the elliptical LC filter 410 of the first stage 502 and to bypass the RC notch filter 430 of the second stage 504).

As illustrated in the circuit diagram of FIG. 5, the multi-stage filter 500 may be bypassed in response to receiving a multiple-stage filter bypass enable signal 509 at the gate of the multi-stage bypass transistor 510. When the multi-stage bypass transistor 510 receives the multiple-stage filter bypass enable signal 509, the multi-stage bypass transistor 510 couples the input node 405 to the output node 440, and the feedback signal (e.g., the TX power feedback signal 388 from the coupler 358 of FIG. 3) bypasses the multiple-stage filter 500. As further illustrated, the first stage 502 of the multi-stage filter 500 may be bypassed in response to receiving a first-stage bypass enable signal 511 at the gate of the first stage bypass transistor 512. When the first stage bypass transistor 512 receives the first stage bypass enable signal 511, the input node 405 is coupled to the connection 422, and the feedback signal bypasses the low-pass elliptical filter 410 and is forwarded to the input of the second stage 504. When operating in this mode, the feedback signal is filtered by the twin "T" RC notch filter 430 and is not filtered by the low-pass elliptical filter 410. Conversely, the second stage 504 can be bypassed in response to receiving a second-stage bypass enable signal 513 at the gate of the second stage bypass transistor 514. When the second stage bypass transistor 514 receives the second stage bypass enable signal 513, the connection 422 is coupled to the output node 440 and the low-pass filtered feedback signal on the connection 422 bypasses the twin "T" RC notch filter 430. When operating in this mode, the feedback signal is filtered by the LPEF 410 and is not filtered by the twin "T" RC notch filter 430. Because each filter stage 502, 504 may impact the energy of a feedback receive signal on a feedback receive path, one or both of the filter stages 502, 504 may be bypassed by a closed loop power control operation that uses the feedback receive signal when no aggressor band signal is being transmitted (or is being transmitted using a relatively low transmit power).

Figure 6:
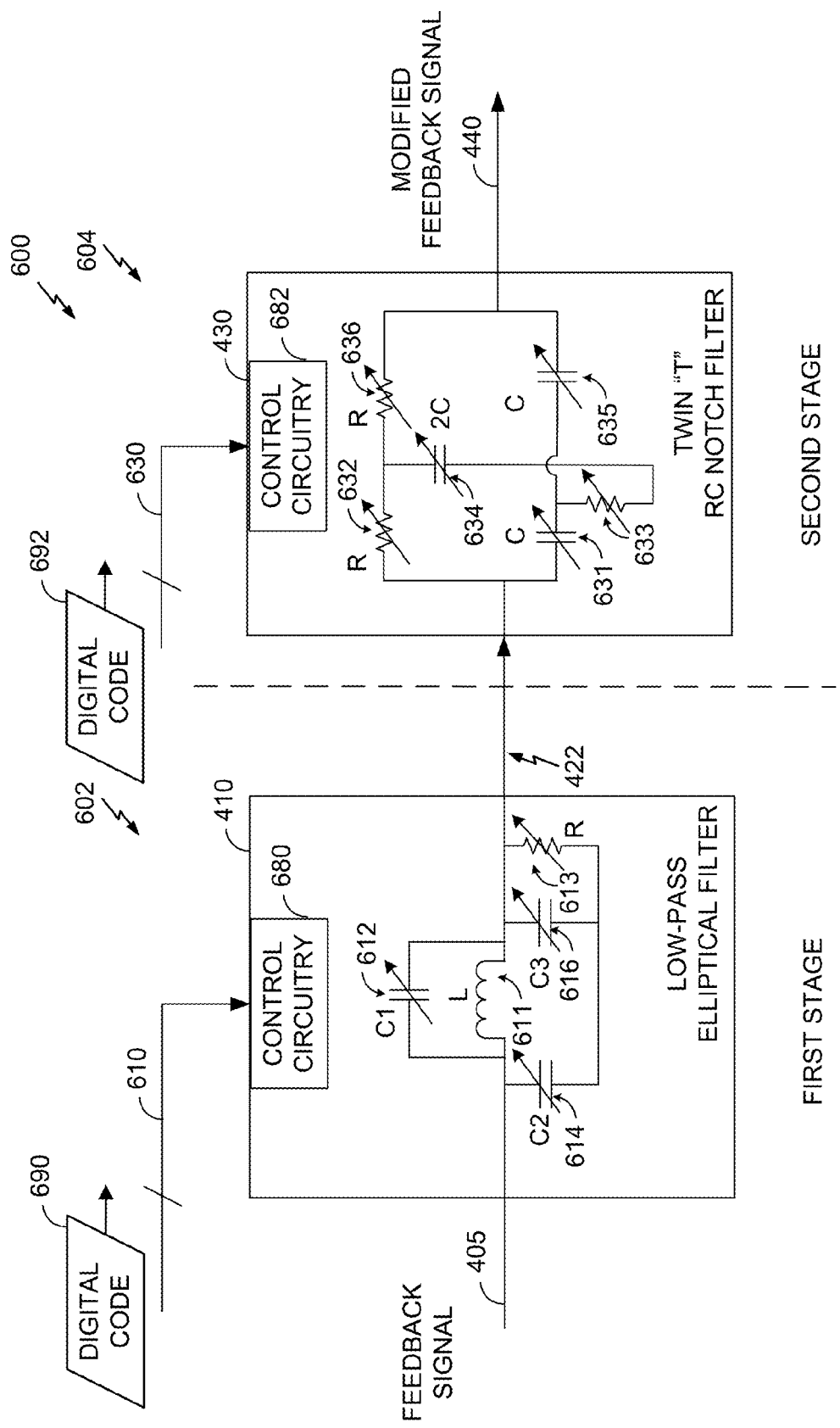
FIG. 6 depicts another exemplary embodiment of an RF filter that may be used in the wireless device of FIG. 1.
Figure 7:
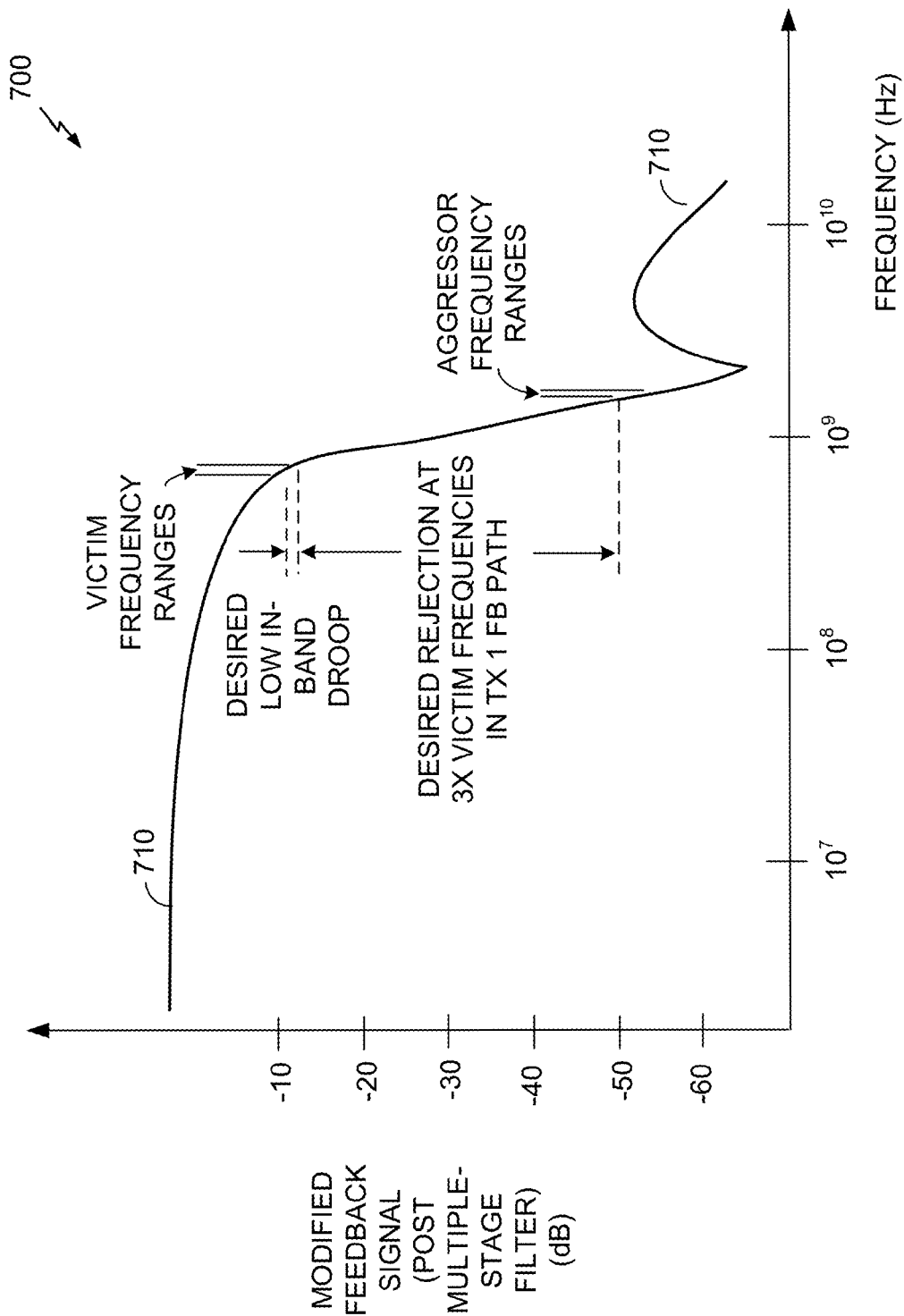
FIG. 7 is a graphical diagram of a frequency response of an RF filter that may be used in the wireless device of FIG. 1.

FIG. 6 is a circuit diagram showing a first stage 602 and a second stage 604 of a multi-stage filter 600 that has adjustable filter components. The multi-stage filter 600 may correspond to the RF filter 294 of FIG. 2 and FIG. 3, the RF filter 400 of FIG. 4, or the RF filter 500 of FIG. 5, as illustrative, non-limiting examples. The multi-stage filter 600 includes an implementation of the first stage 602 in which the elliptical LC filter (e.g., the LPEF 410 of FIG. 4) includes an adjustable component. For example, a first capacitor 612, a second capacitor 614, a third capacitor 616, and a resistor 613 may correspond to adjustable versions of the first capacitor 412, the second capacitor 414, the third capacitor 416, and the resistor 413 of FIG. 4, respectively.

Control circuitry 680 may be configured to receive a digital code 690 corresponding to an adjustable value of the at least one component of the elliptical LC filter. To illustrate, a control word can be provided on a bus 610 to provide various control signals that may be applied to vary the capacitance of one or more of the capacitor 612, the capacitor 614, and the capacitor 616. For example, the capacitor 612 may include multiple switched capacitive elements that are coupled in parallel between the input node 405 and the connection 422. The control circuitry 680 may be configured to decode a received control word (or a portion of a received code word) to generate activation or deactivation signals that are provided to each of the switched capacitive elements to modify a capacitance of the capacitor 612. Similarly, the control circuitry 680 may be configured to decode received code words (or portions of a received code word) to generate activation or deactivation signals corresponding to switchable capacitive elements of the capacitor 614 and/or of the capacitor 616. An additional control signal communicated via the bus 610 can similarly be applied to a control input of the LPEF 410 to vary the resistance of the resistor 613. In some implementations, the inductor 611 coupled to the first node 405 and to the connection 422 may be responsive to the control circuitry 680 to modify an inductance of the inductor 611. Thus, the various control signals may be used to controllably adjust one or more characteristics of the first stage 602 of the multi-stage filter 600 while a communication device is in use, such as when engaged in a data or voice communication session.

The multi-stage filter 600 also includes an implementation of the second stage 604 in which the RC notch filter (e.g., the twin "T" RC notch filter 430 of FIG. 4) includes an adjustable component. For example, a first resistor 632, a second resistor 636, a third resistor 633, a first capacitor 631, a second capacitor 635, and a third capacitor 634 may correspond to adjustable versions of the first resistor 432, the second resistor 436, the third resistor 433, the first capacitor 431, the second capacitor 435, and the third capacitor 434 of FIG. 4, respectively.

Control circuitry 682 may be configured to receive a digital code 692 corresponding to an adjustable value of the at least one passive component of the RC notch filter. To illustrate, a second control word can be provided on bus 630 to introduce control signals that are applied to vary a capacitance of one or more of capacitor 634, the capacitor 631, and the capacitor 635, to achieve a particular relationship between the capacitance values in the second stage 604 of the multi-stage filter 600. Similarly, an additional control signal or signals communicated via the bus 630 may be applied to vary a resistance of the resistor 633 or the respective resistances of the resistor 632 and the resistor 636.

Performance of one or more stages of the multi-stage filter 600 may therefore be modified using control signals to adjust values of one or more components of the multi-stage filter 600. For example, the control circuitry 284 of FIG. 2 may generate one or more control words that are received at the control circuitry 680, 682 via bus 610 and bus 630, respectively. To illustrate, the control words may be generated to modify filter performance based on a mode of operation of one or more transceivers, such as based on a carrier frequency of an aggressor band and/or based on a carrier frequency of a victim band.

Although FIG. 6 illustrates specific passive components of the filter stages 602 and 604 as being adjustable, in other implementations fewer components may be adjustable or additional components may be adjustable. Although the stages 602 and 604 are illustrated as including adjustable components, in other implementations one of the stages 602 or 604 may not include adjustable components.

FIG. 7 is a plot 700 of transmit signal power vs. transmit signal frequency in a receiver feedback path after application of the multi-stage filter 400 of FIG. 4. Transmit signal frequency is indicated along the horizontal axis. Output power is indicated by signal strength (dB) on the vertical axis. An example signal trace 710 indicates that the multi-stage filter 400 when inserted in the transmit feedback path provides a desired low-in band droop or variation between about 775 MHz and 915 MHz (the range of the victim bands) and very high rejection (signal loss) at relatively close WLAN frequencies between about 2.4 GHz and 2.48 GHz. The low in-band droop and sharp roll-off at the victim bands may be produced by an elliptical LC filter, such as the LPEF 410 of FIG. 4, 5, or 6. The large attenuation close to the aggressor bands may be due to the frequency notch of an RF notch filter, such as the twin "T" RC notch filter 430 of FIG. 4, 5, or 6.

In an exemplary embodiment, the RF filter 294 of FIG. 2 and FIG. 3, the multi-stage filter 400 of FIG. 4, the multi-stage filter 500 of FIG. 5, and/or the multi-stage filter 600 of FIG. 6 can be applied to any receiver to reject radio frequency signals having frequencies that are close to a frequency of a radio frequency signal of interest.

Figure 8:
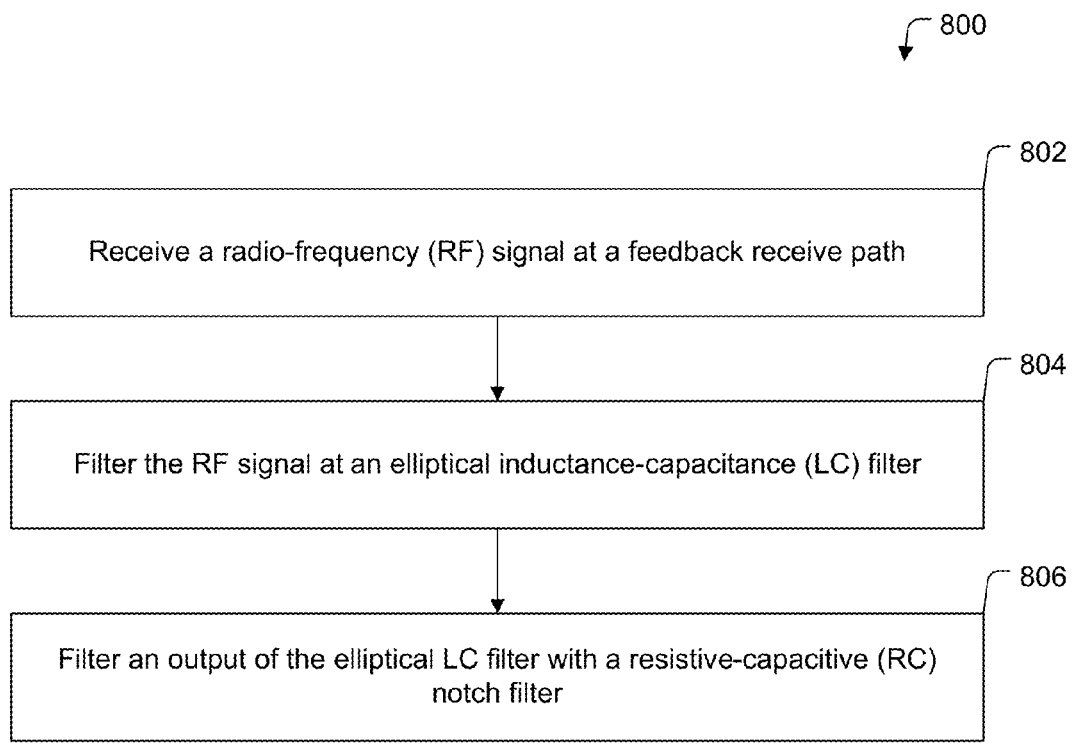
FIG. 8 illustrates an exemplary embodiment of a method that may be performed in the wireless device of FIG. 1.

Referring to FIG. 8, an exemplary embodiment of a method is depicted and generally designated 800. The method 800 may be performed in a wireless device that includes a transceiver with a multi-stage filter in a receive feedback path, such as the wireless device 110 of FIG. 1. For example, the method 800 may be performed by the wireless device 110 of FIG. 1 or FIG. 2, the communication device 300 of FIG. 3, or a device that includes the multi-stage filter 400 of FIG. 4, the multi-stage filter 500 of FIG. 5, or the multi-stage filter 600 of FIG. 6, as illustrative, non-limiting examples.

A radio-frequency (RF) signal is received at a feedback receive path, at 802. For example, the RF signal may include a feedback receive signal (e.g., the feedback receive signal 388) and may be received at the feedback path 314 via the coupler 358 of FIG. 3. The RF signal may correspond to at least a portion of a transmission signal provided to the antenna 355 via the first transmit path 351 of FIG. 3.

The RF signal is filtered at an elliptical inductance-capacitance (LC) filter, at 804. The elliptical LC filter may be a first stage of a multi-stage filter, such as the RF filter 294 of FIG. 2 and FIG. 3, the multi-stage filter 400 of FIG. 4, the multi-stage filter 500 of FIG. 5, or the multi-stage filter 600 of FIG. 6, as illustrative, non-limiting examples. To illustrate, the RF signal may be filtered at the elliptical LC filter 290 of FIG. 2 or at the low-pass elliptical filter 310 of FIG. 4, 5, or 6, as illustrative, non-limiting examples.

An output of the elliptical LC filter is filtered with a resistive-capacitive (RC) notch filter, at 806. The RC notch filter may be a second stage of a multi-stage filter, such as the RF filter 294 of FIG. 2 and FIG. 3, the multi-stage filter 400 of FIG. 4, the multi-stage filter 500 of FIG. 5, or the multi-stage filter 600 of FIG. 6, as illustrative, non-limiting examples. To illustrate, the output of the LC filter may be received at the RC notch filter 292 of FIG. 2 or the RC notch filter 430 of FIG. 4, 5, or 6, as illustrative, non-limiting examples.

The elliptical LC filter and the RC notch filter may be included in an on-chip filter in a transceiver chip of the wireless communication device. For example, the elliptical LC filter and the RC notch filter may be on-chip filters that are included in a transceiver chip that includes the RF transceiver 310 of FIG. 3, such as the on-chip configuration 395 on the transceiver chip 392 of FIG. 3.

The method 800 may also include adjusting a characteristic of at least one component of the elliptical LC filter or the RC notch filter. For example, one or more received control signals may be applied to vary the capacitance of one or more of the capacitor 612, the capacitor 614, and/or the capacitor 616, to vary the resistance of the resistor 613, or any combination thereof. Alternatively, or in addition, one or more received control signals may be applied to vary the capacitance of one or more of the capacitor 631, the capacitor 634, and/or the capacitor 635, to vary the resistance of the resistor 632, the resistor 633, and/or the resistor 636, or any combination thereof.

The method 800 may include receiving a control signal at a bypass circuit that is configured to enable the RF signal to bypass at least one of the elliptical LC filter or the RC notch filter. For example, the control signal may correspond to one or more of the multiple-stage filter bypass enable signal 509, the first stage bypass enable signal 511, or the second stage bypass enable signal 513 of FIG. 5.

Although FIG. 8 depicts a particular order of elements of the method 800, it should be understood that, in other embodiments, elements of the method 800 may be performed in another order. In addition, two or more (or all) of the elements of the method 800 may be performed simultaneously or substantially simultaneously. For example, a multi-stage filter that includes the elliptical LC filter and the RC notch filter may continuously receive a time-varying receive feedback signal and the elliptical LC filter and the RC notch filter may continuously operate to filter received signals in a serially coupled configuration.

In conjunction with the disclosed embodiments, an apparatus is described that includes means for elliptical inductance-capacitance (LC) filtering. For example, the means for elliptical LC filtering may correspond to the elliptical LC filter 290 of FIG. 2, the LPEF 410 of FIG. 4, FIG. 5, or FIG. 6, one or more other filter circuits that introduce low in-band ripple and a relatively sharp filter roll-off, or any combination thereof.

The apparatus includes means for resistive-capacitive (RC) notch filtering serially coupled to the means for elliptical LC filtering. For example, the means for RC notch filtering may correspond to the RC notch filter 292 of FIG. 2, the twin "T" RC notch filter 430 of FIG. 4, FIG. 5, or FIG. 6, one or more other filter circuits that attenuates signal components within a frequency notch, or any combination thereof.

The means for elliptical LC filtering and the means for RC notch filtering may be configured to filter a radio-frequency (RF) signal received by a feedback receive path. For example, the means for elliptical LC filtering and the means for RC notch filtering may correspond to stages of the RF filter 294 of FIG. 2 and FIG. 3, the multi-stage filter 400 of FIG. 4, the multi-stage filter 500 of FIG. 5, the multi-stage filter 600 of FIG. 6, one or more of the filter circuits, or any combination thereof.

In an exemplary embodiment, the means for elliptical LC filtering and the means for RC notch filtering are included in a transceiver chip. For example, the means for elliptical LC filtering and the means for RC notch filtering may correspond to an RF filter, such as the RF filter 294 having the on-chip configuration 395 of FIG. 3. The means for elliptical LC filtering and the means for RC notch filtering may be included in a means for filtering that is configured to attenuate components of the RF signal that correspond to a third harmonic of a carrier frequency of the RF signal, such as described with respect to victim bands and aggressor bands.

The apparatus may also include means for bypassing at least one of the means for elliptical LC filtering or the means for RC notch filtering. For example, the means for bypassing may include a multi-stage bypass circuit that enables the feedback receiver signal to bypass the means for elliptical LC filtering and to bypass the means for RC notch filtering. To illustrate, the means for bypassing may include the bypass circuit 520 of FIG. 5, the multiple-stage bypass transistor 510 of FIG. 5, the first stage bypass transistor 512 of FIG. 5, the second stage bypass transistor 514 of FIG. 5, one or more other circuits configured to bypass at least a portion of the means for filtering, or any combination thereof.

The feedback receive path with a multi-stage filter may be implemented on one or more ICs, analog ICs, RFICs, mixed-signal ICs, ASICs, printed circuit boards (PCBs), electronic devices, etc. The multi-stage filter may also be fabricated using various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing a multi-stage filter on a receive feedback path as described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored as one or more instructions or code on a computer-readable medium. Computer-readable media includes both computer storage media and communication media including any medium that facilitates transfer of a computer program from one place to another. Storage media may be any available media that can be accessed by a computer. In an exemplary embodiment, the storage media is a storage device that stores data. The storage device is not a signal. The storage device may store data based on an optical reflectivity or magnetic orientation of a physical storage material, an amount of charge stored on a floating gate of a transistor or on a plate of a capacitor, etc. By way of example, and not limitation, computer-readable media can comprise RAM, ROM, EEPROM, CD-ROM or other optical disk storage, magnetic disk storage or other magnetic storage devices, or any other medium that can be used to carry or store program code in the form of instructions or data structures and that can be accessed by a computer. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used in this description, the terms "component," "database," "module," "system," and the like are intended to refer to a computer-related entity, either hardware, firmware, a combination of hardware and software, software, or software in execution. To illustrate, the data processor 280 of FIG. 2 may execute program instructions to select values of one or more gain control signals during a closed-loop power control operation based on multi-stage filtering of a feedback receive signal as described herein, to select values of one or more bypass enable signals as described with respect to FIG. 5, to select one or more values of adjustable passive components as described with respect to FIG. 6, or any combination thereof. As illustrative, non-limiting examples, a component may be a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, components may execute from various computer readable media having data structures stored thereon.

Although selected aspects have been illustrated and described in detail, it will be understood that various substitutions and alterations may be made therein without departing from the scope of the present invention, as defined by the following claims.

What is claimed is:

1. An apparatus comprising:
   an elliptical inductance-capacitance (LC) filter; and
   a resistive-capacitive (RC) notch filter serially coupled to an output of the elliptical LC filter, the elliptical LC filter and the RC notch filter configured to filter a radio-frequency (RF) signal received by a feedback receive path of a transmitter.

2. The apparatus of claim 1, further comprising a bypass circuit, wherein the bypass circuit comprises:
   a first stage bypass transistor coupled to the elliptical LC filter; and
   a second stage bypass transistor coupled to the RC notch filter.

3. The apparatus of claim 1, further comprising a bypass circuit, the bypass circuit comprising a multiple-stage bypass transistor coupled to an input of the elliptical LC filter and to an output of the RC notch filter.

4. An apparatus comprising:
   an elliptical inductance-capacitance (LC) filter, and
   a resistive-capacitive (RC) notch filter, the elliptical LC filter and the RC notch filter configured to filter an RF signal received by a feedback receive path of a transmitter coupled to an antenna interface circuit and coupled to a data processor or controller, and the elliptical LC filter serially coupled to an output of the RC notch filter.

5. The apparatus of claim 4, wherein the transmitter is coupled between the antenna interface circuit and the data processor or controller, and further comprising a bypass circuit, the bypass circuit comprising a multiple-stage bypass transistor coupled to each of the elliptical LC filter and the RC notch filter.

6. The apparatus of claim 4, further comprising a bypass circuit configured to enable the RF signal to bypass the RC notch filter or to bypass the elliptical LC filter, wherein the bypass circuit comprises:
   a first stage bypass transistor coupled to the RC notch filter; and
   a second stage bypass transistor coupled to the elliptical LC filter.

7. The apparatus of claim 4, wherein the RC notch filter comprises:
   a first resistor coupled to a first node and to a second node;
   a first capacitor coupled to the first node and to a third node;
   a second resistor coupled to the second node and to a fourth node; and
   a second capacitor coupled to the third node and to the fourth node.

8. The apparatus of claim 4, wherein the elliptical LC filter comprises:
   a first capacitor coupled to a first node and to a second node;
   an inductor coupled to the first node and to the second node;
   a second capacitor coupled to the first node and to a third node;
   a third capacitor coupled to the second node and to the third node; and
   a resistor coupled to the second node and to the third node.

9. The apparatus of claim 1, wherein the elliptical LC filter comprises:
   a first capacitor coupled to a first node and to a second node;
   an inductor coupled to the first node and to the second node;
   a second capacitor coupled to the first node and to a third node;
   a third capacitor coupled to the second node and to the third node; and
   a resistor coupled to the second node and to the third node.

10. The apparatus of claim 1, wherein the RC notch filter comprises:
    a first resistor coupled to a first node and to a second node;
    a first capacitor coupled to the first node and to a third node;
    a second resistor coupled to the second node and to a fourth node; and
    a second capacitor coupled to the third node and to the fourth node.

11. The apparatus of claim 10, wherein the RC notch filter further comprises a third resistor and a third capacitor coupled in series between the second node and the third node.

12. The apparatus of claim 1, wherein the feedback receive path is coupled to a coupler of an RF transmission path of a transmitter, and further comprising a multi-stage bypass circuit configured to enable the RF signal to bypass the elliptical LC filter and the RC notch filter, wherein the multi-stage bypass circuit comprises a multiple-stage bypass transistor coupled to each of the elliptical LC filter and the RC notch filter.

13. The apparatus of claim 1, wherein the elliptical LC filter and the RC notch filter are included in a RF filter that is configured to attenuate components of the RF signal that correspond to a third harmonic of a carrier frequency of the RF signal.

14. The apparatus of claim 1, wherein the elliptical LC filter includes a variable resistor and is directly connected to the RC notch filter.

15. An apparatus comprising:
    means for elliptical inductance-capacitance (LC) filtering; and
    means for resistive-capacitive (RC) notch filtering serially coupled to an output of the means for elliptical LC filtering, the means for elliptical LC filtering and the means for RC notch filtering configured to filter a radio-frequency (RF) signal received by a feedback receive path of a transmitter.

16. The apparatus of claim 15,
    wherein the means for elliptical LC filtering and the means for RF notch filtering are included in a transceiver chip.

17. The apparatus of claim 15, further comprising means for bypassing at least one of the means for elliptical LC filtering or the means for RC notch filtering.

18. The apparatus of claim 15, wherein the means for elliptical LC filtering or the means for RC notch filtering includes an adjustable component.

19. A method comprising:
    receiving a radio-frequency (RF) signal at a feedback receive path of a transmitter;
    filtering the RF signal at an elliptical inductance-capacitance (LC) filter; and filtering an output of the elliptical LC filter with a resistive-capacitive (RC) notch filter.

20. The method of claim 19, further comprising adjusting a characteristic of at least one component of the elliptical LC filter or the RC notch filter.

21. The method of claim 19, further comprising receiving a control signal at a bypass circuit that is configured to enable the RF signal to bypass at least one of the elliptical LC filter or the RC notch filter.

* * * * *